(12) United States Patent
Ollier (10) Patent No.: US 12,259,341 B2
(45) Date of Patent: Mar. 25, 2025

(54) TARGETED COLLIMATION OF DETECTORS USING REAR COLLIMATORS

(71) Applicant: Rapiscan Holdings, Inc., Hawthorne, CA (US)

(72) Inventor: James Ollier, Huyton (GB)

(73) Assignee: Rapiscan Holdings, Inc., Hawthorne, CA (US)

( * ) Notice: Subject to any disclaimer, the term of this patent is extended or adjusted under 35 U.S.C. 154(b) by 131 days.

(21) Appl. No.: 18/051,757

(22) Filed: Nov. 1, 2022

(65) Prior Publication Data

US 2023/0135695 A1     May 4, 2023

Related U.S. Application Data

(60) Provisional application No. 63/263,527, filed on Nov. 4, 2021.

(51) Int. Cl.
*G01N 23/00* (2006.01)
*G01N 23/046* (2018.01)
*G01N 23/20008* (2018.01)

(52) U.S. Cl.
CPC ..... *G01N 23/20008* (2013.01); *G01N 23/046* (2013.01)

(58) Field of Classification Search
None
See application file for complete search history.

(56) References Cited

U.S. PATENT DOCUMENTS

| | | |
|---|---|---|
| 2,831,123 A | 4/1958 | Daly |
| 3,766,387 A | 10/1973 | Heffan |
| 3,770,955 A | 11/1973 | Tomita |
| 3,784,837 A | 1/1974 | Holmstrom |
| 3,904,923 A | 9/1975 | Schwartz |
| 4,047,035 A | 9/1977 | Dennhoven |
| 4,139,771 A | 2/1979 | Dennhoven |
| 4,210,811 A | 7/1980 | Dennhoven |
| 4,216,499 A | 8/1980 | Manfred |

(Continued)

FOREIGN PATENT DOCUMENTS

| | | |
|---|---|---|
| CN | 101467071 B | 6/2012 |
| CN | 102893341 A | 1/2013 |

(Continued)

OTHER PUBLICATIONS

International Search Report for PCT/US22/79057, Mar. 6, 2023.

(Continued)

*Primary Examiner* — Hoon K Song (74) *Attorney, Agent, or Firm* — Novel IP (57) ABSTRACT

A detector arrangement including a plurality of detector elements enclosed in a housing, wherein the housing has first, second, third and fourth sides, wherein the first side faces a radiation source and the second side is opposite to the first side, and wherein each of the plurality of detector elements points substantially towards the radiation source; and a plurality of collimators, wherein each of the plurality of collimators is positioned behind an associated detector element of the plurality of detector elements so as to extend from a rear side of the associated detector element to either the second side of the housing or a point proximate the second side of the housing.

20 Claims, 4 Drawing Sheets

(56) References Cited

U.S. PATENT DOCUMENTS

| | | | |
|---|---|---|---|
| 4,366,382 | A | 12/1982 | Kotowski |
| 4,430,568 | A | 2/1984 | Yoshida |
| 4,566,113 | A | 1/1986 | Gerhard |
| 4,599,740 | A | 7/1986 | Cable |
| 4,626,688 | A | 12/1986 | Barnes |
| 4,641,330 | A | 2/1987 | Herwig |
| 4,709,382 | A | 11/1987 | Sones |
| 4,731,534 | A | 3/1988 | Klein |
| 4,736,401 | A | 4/1988 | Donges |
| 4,745,631 | A | 5/1988 | Paolini |
| 4,788,704 | A | 11/1988 | Donges |
| 4,817,123 | A | 3/1989 | Sones |
| 4,825,454 | A | 4/1989 | Annis |
| 4,872,188 | A | 10/1989 | Lauro |
| 4,884,289 | A | 11/1989 | Glockmann |
| 4,979,202 | A | 12/1990 | Siczek |
| 4,991,189 | A | 2/1991 | Boomgaarden |
| 4,995,066 | A | 2/1991 | Harding |
| 5,022,062 | A | 6/1991 | Annis |
| 5,038,370 | A | 8/1991 | Harding |
| 5,065,418 | A | 11/1991 | Bermbach |
| 5,091,924 | A | 2/1992 | Bermbach |
| 5,098,640 | A | 3/1992 | Gozani |
| 5,179,581 | A | 1/1993 | Annis |
| 5,181,234 | A | 1/1993 | Smith |
| 5,182,764 | A | 1/1993 | Peschmann |
| 5,221,843 | A | 6/1993 | Alvarez |
| 5,224,144 | A | 6/1993 | Annis |
| 5,237,598 | A | 8/1993 | Albert |
| 5,247,561 | A | 9/1993 | Kotowski |
| 5,253,283 | A | 10/1993 | Annis |
| 5,313,511 | A | 5/1994 | Annis |
| 5,367,552 | A | 11/1994 | Peschmann |
| 5,379,334 | A | 1/1995 | Zimmer |
| 5,493,596 | A | 2/1996 | Annis |
| 5,548,123 | A | 8/1996 | Perez-Mendez |
| 5,600,303 | A | 2/1997 | Husseiny |
| 5,638,420 | A | 6/1997 | Armistead |
| 5,642,393 | A | 6/1997 | Krug |
| 5,642,394 | A | 6/1997 | Rothschild |
| 5,666,393 | A | 9/1997 | Annis |
| 5,687,210 | A | 11/1997 | Maitrejean |
| 5,692,028 | A | 11/1997 | Geus |
| 5,751,837 | A | 5/1998 | Watanabe |
| 5,764,683 | A | 6/1998 | Swift |
| 5,768,334 | A | 6/1998 | Maitrejean |
| 5,787,145 | A | 7/1998 | Geus |
| 5,805,660 | A | 9/1998 | Perion |
| 5,838,759 | A | 11/1998 | Armistead |
| 5,903,623 | A | 5/1999 | Swift |
| 5,910,973 | A | 6/1999 | Grodzins |
| 5,930,326 | A | 7/1999 | Rothschild |
| 5,940,468 | A | 8/1999 | Huang |
| 5,974,111 | A | 10/1999 | Krug |
| 6,031,890 | A | 2/2000 | Bermbach |
| 6,058,158 | A | 5/2000 | Eiler |
| 6,067,344 | A | 5/2000 | Grodzins |
| 6,081,580 | A | 6/2000 | Grodzins |
| 6,094,472 | A | 7/2000 | Smith |
| 6,151,381 | A | 11/2000 | Grodzins |
| 6,188,747 | B1 | 2/2001 | Geus |
| 6,192,101 | B1 | 2/2001 | Grodzins |
| 6,192,104 | B1 | 2/2001 | Adams |
| 6,195,413 | B1 | 2/2001 | Geus |
| 6,198,795 | B1 | 3/2001 | Naumann |
| 6,218,943 | B1 | 4/2001 | Ellenbogexn |
| 6,249,567 | B1 | 6/2001 | Rothschild |
| 6,252,929 | B1 | 6/2001 | Swift |
| 6,256,369 | B1 | 7/2001 | Lai |
| 6,272,206 | B1 | 8/2001 | Bjorkholm |
| 6,278,115 | B1 | 8/2001 | Annis |
| 6,282,260 | B1 | 8/2001 | Grodzins |
| 6,292,533 | B1 | 9/2001 | Swift |
| 6,301,326 | B2 | 10/2001 | Bjorkholm |
| 6,320,933 | B1 | 11/2001 | Grodzins |
| 6,347,132 | B1 | 2/2002 | Annis |
| 6,356,620 | B1 | 3/2002 | Rothschild |
| 6,424,695 | B1 | 7/2002 | Grodzins |
| 6,434,219 | B1 | 8/2002 | Rothschild |
| 6,435,715 | B1 | 8/2002 | Betz |
| 6,442,233 | B1 | 8/2002 | Grodzins |
| 6,445,765 | B1 | 9/2002 | Frank |
| 6,453,003 | B1 | 9/2002 | Springer |
| 6,453,007 | B2 | 9/2002 | Adams |
| 6,456,684 | B1 | 9/2002 | Mun |
| 6,459,761 | B1 | 10/2002 | Grodzins |
| 6,459,764 | B1 | 10/2002 | Chalmers |
| 6,473,487 | B1 | 10/2002 | Le |
| RE37,899 | E | 11/2002 | Grodzins |
| 6,483,894 | B2 | 11/2002 | Hartick |
| 6,507,025 | B1 | 1/2003 | Verbinski |
| 6,532,276 | B1 | 3/2003 | Hartick |
| 6,542,574 | B2 | 4/2003 | Grodzins |
| 6,542,578 | B2 | 4/2003 | Ries |
| 6,542,580 | B1 | 4/2003 | Carver |
| 6,546,072 | B1 | 4/2003 | Chalmers |
| 6,552,346 | B2 | 4/2003 | Verbinski |
| 6,563,903 | B2 | 5/2003 | Kang |
| 6,580,778 | B2 | 6/2003 | Meder |
| 6,584,170 | B2 | 6/2003 | Aust |
| 6,597,760 | B2 | 7/2003 | Beneke |
| 6,606,516 | B2 | 8/2003 | Levine |
| 6,636,581 | B2 | 10/2003 | Sorenson |
| 6,653,588 | B1 | 11/2003 | Gillard-Hickman |
| 6,658,087 | B2 | 12/2003 | Chalmers |
| 6,663,280 | B2 | 12/2003 | Doenges |
| 6,665,373 | B1 | 12/2003 | Kotowski |
| 6,665,433 | B2 | 12/2003 | Roder |
| 6,735,279 | B1 | 5/2004 | Jacobs |
| 6,763,635 | B1 | 7/2004 | Lowman |
| 6,785,357 | B2 | 8/2004 | Bernardi |
| 6,812,426 | B1 | 11/2004 | Kotowski |
| 6,816,571 | B2 | 11/2004 | Bijjani |
| 6,837,422 | B1 | 1/2005 | Meder |
| 6,839,403 | B1 | 1/2005 | Kotowski |
| 6,843,599 | B2 | 1/2005 | Le |
| 6,920,197 | B2 | 7/2005 | Kang |
| 7,039,159 | B2 | 5/2006 | Muenchau |
| 7,166,844 | B1 | 1/2007 | Gormley |
| 7,207,713 | B2 | 4/2007 | Lowman |
| 7,505,562 | B2 | 3/2009 | Dinca |
| 7,609,807 | B2 | 10/2009 | Leue |
| 8,576,989 | B2 | 11/2013 | Kaminski |
| 8,831,176 | B2 | 9/2014 | Morton |
| 9,117,564 | B2 | 8/2015 | Rommel |
| 9,257,208 | B2 | 2/2016 | Rommel |
| 9,306,673 | B1 | 4/2016 | Macrae |
| 9,579,526 | B2 | 2/2017 | Kunz |
| 11,340,361 | B1 * | 5/2022 | Couture ............... G01T 1/1606 |
| 2002/0031202 | A1 | 3/2002 | Callerame |
| 2004/0017888 | A1 | 1/2004 | Seppi |
| 2004/0086078 | A1 | 5/2004 | Adams |
| 2004/0125914 | A1 | 7/2004 | Kang |
| 2004/0141584 | A1 | 7/2004 | Bernardi |
| 2004/0258198 | A1 | 12/2004 | Carver |
| 2005/0117700 | A1 | 6/2005 | Peschmann |
| 2005/0135668 | A1 | 6/2005 | Polichar |
| 2005/0156734 | A1 | 7/2005 | Zerwekh |
| 2005/0157842 | A1 | 7/2005 | Agrawal |
| 2005/0169421 | A1 | 8/2005 | Muenchau |
| 2006/0182223 | A1 | 8/2006 | Heuscher |
| 2006/0256917 | A1 | 11/2006 | Jacobs |
| 2006/0284094 | A1 | 12/2006 | Inbar |
| 2007/0007455 | A1 | 1/2007 | Juni |
| 2007/0110215 | A1 | 5/2007 | Hu |
| 2007/0140423 | A1 | 6/2007 | Foland |
| 2007/0172129 | A1 | 7/2007 | Tortora |
| 2007/0189454 | A1 | 8/2007 | Georgeson |
| 2007/0210255 | A1 | 9/2007 | Bjorkholm |
| 2007/0269005 | A1 | 11/2007 | Chalmers |
| 2007/0280416 | A1 | 12/2007 | Bendahan |
| 2007/0280502 | A1 | 12/2007 | Paresi |
| 2007/0286337 | A1 | 12/2007 | Wang |
| 2008/0044801 | A1 | 2/2008 | Modica |

(56) References Cited

U.S. PATENT DOCUMENTS

| | | |
|---|---|---|
| 2008/0304622 A1 | 12/2008 | Morton |
| 2011/0090059 A1 | 4/2011 | Sadr |
| 2012/0147987 A1 | 6/2012 | Calderbank |
| 2013/0307923 A1 | 11/2013 | Inglese |
| 2014/0133631 A1 | 5/2014 | Wood |
| 2014/0341345 A1 | 11/2014 | Morton |
| 2016/0003967 A1 | 1/2016 | Chen |
| 2016/0033426 A1 | 2/2016 | Georgeson |
| 2016/0106384 A1 | 4/2016 | Park |
| 2017/0023696 A1 | 1/2017 | Morton |
| 2018/0067061 A1 | 3/2018 | Butani |
| 2018/0328861 A1 | 11/2018 | Grodzins |
| 2019/0293810 A1 | 9/2019 | Couture |
| 2019/0391280 A1 | 12/2019 | Couture |
| 2021/0244374 A1* | 8/2021 | Zhao ............... A61B 6/4241 |
| 2023/0251209 A1* | 8/2023 | Bendahan ............ G01N 33/227 378/62 |

FOREIGN PATENT DOCUMENTS

| | | |
|---|---|---|
| CN | 104584137 B | 5/2017 |
| CN | 108287358 A | 7/2018 |
| CN | 112739264 A | 4/2021 |
| CN | 116829929 A | 9/2023 |
| EP | 0077018 A1 | 4/1983 |
| EP | 0176314 | 4/1986 |
| EP | 0287707 | 10/1988 |
| EP | 0919186 A2 | 6/1999 |
| EP | 1413898 A1 | 4/2004 |
| EP | 1907831 A2 | 4/2008 |
| EP | 2548207 A1 | 1/2013 |
| EP | 2049888 B1 | 5/2014 |
| EP | 2870608 B1 | 1/2020 |
| EP | 3640952 A1 | 4/2020 |
| EP | 3829441 A1 | 6/2021 |
| EP | 4176249 A1 | 5/2023 |
| EP | 4248195 A1 | 9/2023 |
| GB | 2255634 A | 11/1992 |
| GB | 2438317 A | 11/2007 |
| GB | 2494964 B | 6/2016 |
| GB | 2615497 A | 8/2023 |
| JP | 2009534669 A | 9/2009 |
| JP | 2013522622 A | 6/2013 |
| JP | 2015523570 | 8/2015 |
| JP | 2021533348 A | 12/2021 |
| MX | 2008013595 A | 3/2009 |
| WO | 1998055851 A1 | 12/1998 |
| WO | 2004010127 A1 | 1/2004 |
| WO | 2005098400 | 10/2005 |
| WO | 2006036076 A1 | 4/2006 |
| WO | 2006045019 | 4/2006 |
| WO | 2006078691 A2 | 7/2006 |
| WO | 2007051092 A2 | 5/2007 |
| WO | 2009012453 A1 | 1/2009 |

OTHER PUBLICATIONS

"Mobile X-Ray Inspection Systems" Internet citation Feb. 12, 2007, pp. 1-2, XP007911046 Retrieved from the Internet: URL:http://web.archive.org/web/20070212000928/http://www.bombdetection.co-m/cat.sub.—details.php?catid=20 [retrieved on Jan. 6, 2010].

Molchanov P. A Et Al: 'Nanosecond gated optical sensors for ocean optic applications' Sensors Applications Symposium, 2006. Proceedings of The 2006 IEEE Houston, Texas, USA Feb. 7-9, 2006, Piscataway, NJ, USA, IEEE, Feb. 7, 2006 (Feb. 7, 2006), pp. 147-150, XP010917671 ISBN: 978-0-7803-9580-0.

International Search Report PCT/GB2009/000515, Feb. 23, 2010, Rapiscan Security Products, Inc.

International Search Report for PCT/GB2009/000497, Jan. 22, 2010.

International Search Report PCT/GB2009/001444, Apr. 6, 2010, Rapiscan Security Products.

International Search Report for PCT/GB2009/000556, Feb. 19, 2010, Rapiscan Security Products, Inc.

International Search Report for PCT/GB2009/001277, Jul. 20, 2010, Rapiscan Systems Inc.

International Search Report for PCT/GB2009/001275, Jul. 24, 2009, Rapiscan Security Products Inc.

* cited by examiner

TARGETED COLLIMATION OF DETECTORS USING REAR COLLIMATORS

CROSS-REFERENCE

The present application relies on U.S. Patent Provisional Application No. 63/263,527, titled "Targeted Collimation of Detectors Using Associated Collimators", and filed on Nov. 4, 2021, for priority, which is herein incorporated by reference in its entirety.

FIELD

The present specification relates generally to X-ray scanning systems and, more specifically, to the positioning and orientation of individual collimators or each collimator of a plurality of collimators with reference to an associated detector element of a plurality of detector elements.

BACKGROUND

To produce a radiographic image, an X-ray radiation source for producing an X-ray beam is required in addition to an array of detectors that are sensitive to the X-ray beam produced. In transmission scanning systems, an object required to be imaged passes between the radiation source and the array of detectors and attenuates the X-ray beam, producing a contrast in the signals observed on the detector array. At all points in this simple model, scattered X-rays occur, which are undesirable for this form of transmission imaging. The scattered X-rays result in background noise which can distort the true X-ray signal on the detector array and reduce the contrast required for imaging. Scatter reduction is achieved by using collimation, which can be implemented in various ways to occlude parts of the X-ray beam at the radiation source or shield parts of the detection system to prevent scattered photons from reaching the detectors.

Figure 1A:
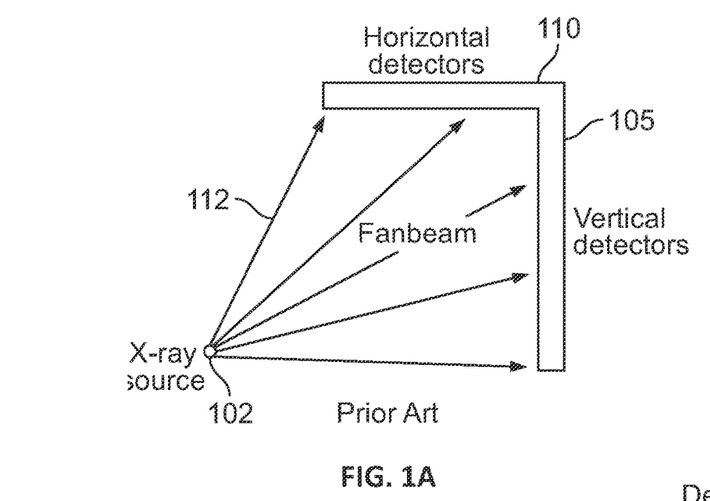
FIG. 1A illustrates an X-ray scanning system with a vertical detector arrangement and a horizontal detector arrangement, forming an upside-down or inverted "L" shaped detector array.
Figure 1B:
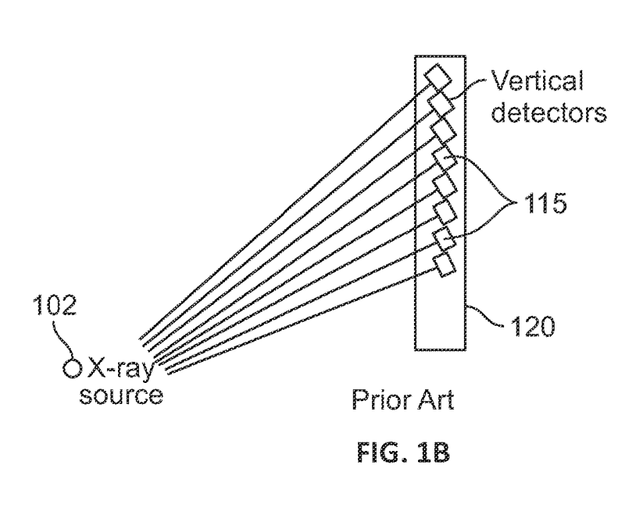
FIG. 1B illustrates a saw-tooth arrangement of a plurality of detectors housed in a vertical detector arrangement.

As shown in FIG. 1A, for mechanical ease, large scale scanning systems often have a plurality of detectors that are arranged in an upside-down L-shape, where there is a vertical arrangement of detectors 105 and a horizontal arrangement of detectors 110. An X-ray source 102 is positioned and collimated such that it can produce a fan shaped beam 112 which is incident on the vertical detectors 105 and horizontal detectors 110. Within the vertical and horizontal detector arrangements, each individual detector or a plurality of individual detectors 115, as shown in FIG. 1B, is positioned such that it directly points towards the X-ray source 102. The detectors 115 may form a staggered or saw-tooth arrangement within the confines of a detector housing such as, for example, a vertical detector housing 120.

Figure 1C:
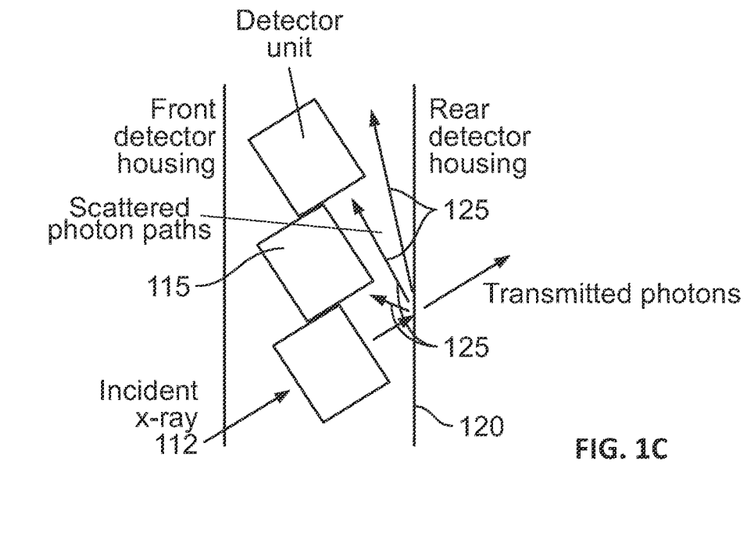
FIG. 1C illustrates a plurality of scatter paths due to an X-ray beam incident on an arrangement of individual detectors within a detector array, as is seen in the conventional detectors described in FIG. 1A and FIG. 1B.

However, the aforementioned vertical detector arrangement 105 and horizontal detector arrangement 110 is fraught with scatter occurring between each individual detector unit 115 and the detector housing 120, as illustrated in FIG. 1C, where the possible scatter paths taken by scattered photons 125 of an incident X-ray beam 112 are shown. Here, the underside of each detector unit 115 is exposed to the scattered photons 125 which causes an increase in signal in the unit 115 that can distort the radiographic image. In areas of high attenuation and due to the inverted L-shaped detector arrangement formed by vertical detector array 105 and horizontal detector array 110, scatter causes visible artifacts in the radiographic image that affect the X-ray inspection system's ability to penetrate dense areas of target object under inspection, such as cargo. A large level of scatter is observed in the bottom detector units 115 of detector arrangements 105/110. The level of scatter can be more than twice as much as observed in the other individual detector units 115, resulting in visible artifacts in the scan images. Scatter emanating from below the sensitive detector units appears to be further scattered by detector housing 120 into first individual detector units 115 of each detector arrangement 105/110 that subsequently acts as a shield for the remainder of the detectors 115. Although algorithms/filters can help clean up these images to some degree, reducing the amount of scattered X rays is the most effective way to increase the image quality.

Therefore, there is a need for a targeted collimation of each detector in an array of detectors to prevent scattered X-ray photons from entering the detectors.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a detector array adapted to detect radiation emitted from a radiation source, comprising: a plurality of detector elements enclosed in a housing, wherein the housing has at least a first wall and a second opposing wall positioned a predefined distance away from the first wall, wherein the first wall faces the radiation source, wherein a front side of each of the plurality of detector elements substantially faces the first wall, and wherein a rear side of each of the plurality of detector elements substantially faces the second opposing wall; and a plurality of collimators, wherein each of the plurality of collimators is positioned behind one of the plurality of detector elements such that said one of the plurality of detector elements is positioned between said each of the plurality of collimators and the first wall and such that said each of the plurality of collimators extends from the rear side of said one of the plurality of detector elements to a position proximate the second side of the housing.

Optionally, each of the plurality of collimators extends from the rear side of said one of the plurality of detector elements to physically touch the second side of the housing.

Optionally, each of the plurality of detector elements has a length, wherein each of the plurality of collimators is positioned at a point that is at half of the length of the corresponding one of the plurality of detector elements.

Optionally, each collimator of the plurality of detector elements is oriented perpendicular to the rear side of the corresponding one of the plurality of detector elements.

Optionally, each of the plurality of collimators has a width, wherein the radiation emitted from the radiation source is an X-ray beam having a thickness, wherein said width is in a range of 10% to 100% of said thickness of the X-ray beam.

Optionally, each of the plurality of collimators has a width in a range of 2 mm to 5 mm.

The present specification also discloses a detection system for scanning an object, comprising: an X-ray source configured to generate an X-ray beam that is projected onto the object; a detector array adapted to receive the X-ray beam that is transmitted through the object, wherein the detector array comprises a plurality of detector elements enclosed in a housing, wherein the housing has at least a first side and a second opposing side positioned a first distance away from the first side, wherein each of the plurality of detector elements is positioned between the first side and the second opposing side such that a front side of each detector is positioned to receive the X-ray beam at a perpendicular angle relative to a center of the front side; and a plurality of collimators, wherein each of the plurality of collimators is positioned behind one of the plurality of detector elements and wherein each of the plurality of collimators is oriented perpendicular to a rear side of the corresponding one of the plurality of detector elements.

Optionally, the plurality of detector elements is arranged in a saw-tooth arrangement.

Optionally, each of the plurality of detector elements is tilted substantially towards the X-ray source for limiting parallax detection of the X-ray beam.

Optionally, each of the plurality of detector elements is tilted substantially towards the X-ray source such that a central axis of each of the plurality of detector elements is directly aligned with at the X-ray source.

Optionally, each of the plurality of detector elements is separated from the second opposing side by a second distance. Optionally, each of the plurality of collimators has a length that is equal to 50% to 99% of said second distance. Optionally, each of the plurality of collimators has a length that is substantially equal to the second distance. Optionally, each of the plurality of collimators has a length that is equal to 80% to 100% of said second distance.

Optionally, each of the plurality of detector elements has a length, and each of the plurality of collimators is positioned at a point that is in a range of 40% to 60% of the length of the corresponding one of the plurality of detector elements.

Optionally, each of the plurality of detector elements has a length, and each of the plurality of collimators is positioned at a point that is in a range of 48% to 52% of the length of the corresponding one of the plurality of detector elements.

Optionally, each of the plurality of collimators is positioned at in a range of 10 mm to 0 mm from a center of the rear side of the corresponding one of the plurality of detector elements.

Optionally, the X-ray beam is a fan beam having a first width, wherein each of the plurality of collimators has a second width adapted to cover 50% to 100% of the first width.

Optionally, each of the plurality of collimators has a thickness of 3 mm.

Optionally, each of the plurality of collimators has a thickness of in a range of 1.5 mm to 4.5 mm.

The present specification also discloses a detector for sensing radiation arriving from an object being scanned by a radiation beam, wherein the radiation beam is generated by an X-ray radiation source, the detector comprising: a plurality of detector elements enclosed in a housing, wherein a first side of the housing faces the radiation source and a second side of the housing is opposite to the first side, wherein each of the plurality of detector elements has a third side and a fourth side opposite to the third side, and wherein a first axis normal to the third side points substantially towards the radiation source; and a plurality of collimators, wherein each of the plurality of collimators has an associated detector element of the plurality of detector elements, wherein each of the plurality of collimators has a length that covers all or a substantial part of a distance between the fourth side of the associated detector element and the second side of the housing.

Optionally, each of the plurality of collimators has a surface facing the fourth side of the associated detector element, wherein a second normal to the surface also points substantially towards the radiation source. Optionally, the first and second normal are substantially parallel. Optionally, the first and second normal are substantially coaxial.

Optionally, the associated detector element has a length, and each of the plurality of collimators is positioned at a point which is at half of the length of the associated detector element.

Optionally, each of the plurality of collimators has a thickness of about 3 mm.

The present specification also discloses a detector arrangement comprising: a plurality of detector elements enclosed in a housing, wherein the housing has a first side, a second side, a third side and a fourth side, wherein the first side faces a radiation source and the second side opposes the first side, and wherein each of the plurality of detector elements points substantially towards the radiation source; and a plurality of collimators, wherein each of the plurality of collimators is positioned behind an associated detector element of the plurality of detector elements such that it extends from a rear side of the associated detector element to either the second side of the housing or a point proximate to the second side of the housing.

Optionally, the associated detector element has a length, wherein each of the plurality of collimators is positioned at a point which is positioned at half of the length of the associated detector element.

Optionally, each of the plurality of detector elements is defined by an enclosure having a fifth side facing the radiation source and a sixth side opposite to the fifth side, and wherein each of the plurality of collimators is oriented perpendicular to the sixth side of the associated detector element.

Optionally, each of the plurality of collimators has a width in a range of 10% to 100% of thickness of an X-ray beam for detection by the detector arrangement.

Optionally, each of the plurality of collimators has a thickness in a range of 2 mm to 5 mm.

The present specification also discloses a system for scanning an object, comprising: a radiation source for generating an X-ray beam that is projected onto the object; a detector arrangement for receiving the X-ray beam that is transmitted through the object, wherein the detector arrangement includes a plurality of detector elements enclosed in a housing, wherein a first side of the housing faces the radiation source and a second side of the housing is opposite to the first side, wherein each of the plurality of detector elements has a third side and a fourth side opposite to the third side, and wherein a first axis normal to the third side points substantially towards the radiation source; and a plurality of collimators, wherein each of the plurality of collimators is positioned behind an associated detector element of the plurality of detector elements, wherein each of the plurality of collimators has a surface facing the fourth side of the associated detector element, and wherein a second axis normal to the surface also points substantially towards the radiation source.

Optionally, the plurality of detector elements is arranged in a saw-tooth arrangement.

Optionally, the first axis and the second axis are substantially parallel.

Optionally, the first axis and the second axis are substantially coaxial.

Optionally, each of the plurality of collimators has a length that covers all or a substantial part of a distance between the fourth side of the associated detector element and the second side of the housing.

Optionally, the associated detector element has a length, and wherein each of the plurality of collimators is positioned at a point which is at half of the length of the associated detector element.

Optionally, each of the plurality of collimators is oriented perpendicular to the fourth side of the associated detector element.

Optionally, the X-ray beam is a fan beam, and wherein each of the plurality of collimators has a width adapted to cover 50% to 100% of a width of the fan beam.

Optionally, each of the plurality of collimators has a thickness of about 3 mm.

The present specification discloses a detector for sensing radiation arriving from an object being scanned by a radiation beam, wherein the radiation beam is generated by an X-ray radiation source, the detector comprising: a plurality of detector elements enclosed in a housing, wherein a first side of the housing faces the radiation source and a second side of the housing is opposite to the first side, wherein each of the plurality of detector elements has a third side and a fourth side opposite to the third side, and wherein a first axis normal to the third side points substantially towards the radiation source; and a plurality of collimators, wherein each of the plurality of collimators has an associated detector element of the plurality of detector elements, wherein each of the plurality of collimators has a length that covers all or a substantial part of a distance between the fourth side of the associated detector element and the second side of the housing.

Optionally, each of the plurality of collimators has a surface facing the fourth side of the associated detector element, and wherein a second normal to the surface also points substantially towards the radiation source.

Optionally, the first and second normal are substantially parallel.

Optionally, the first and second normal are substantially coaxial.

Optionally, the associated detector element has a length, and wherein each of the plurality of collimators is positioned at a point which is at half of the length of the associated detector element.

Optionally, each of the plurality of collimators has a thickness of about 3 mm.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

In various embodiments, the system includes at least one processor capable of processing programmatic instructions, has a memory capable of storing programmatic instructions, and employs software comprised of a plurality of programmatic instructions for performing the processes described herein.

In various embodiments, a computing device may be employed to receive and process data signals and image data and may include an input/output controller, at least one communication interface and a system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across a network of multiple computer systems and architectures. In some embodiments, execution of a plurality of sequences of programmatic instructions or code, which are stored in one or more non-volatile memories, enable or cause the CPU of the computing device to perform or enable various functions, processes and algorithms, such as, for example, performing image reconstruction for display on a screen. In alternate embodiments, hard-wired circuitry may be used in place of, or in combination with, software instructions for implementation of the processes of systems and methods described in this application. Thus, the systems and methods described are not limited to any specific combination of hardware and software.

Figure 2A:
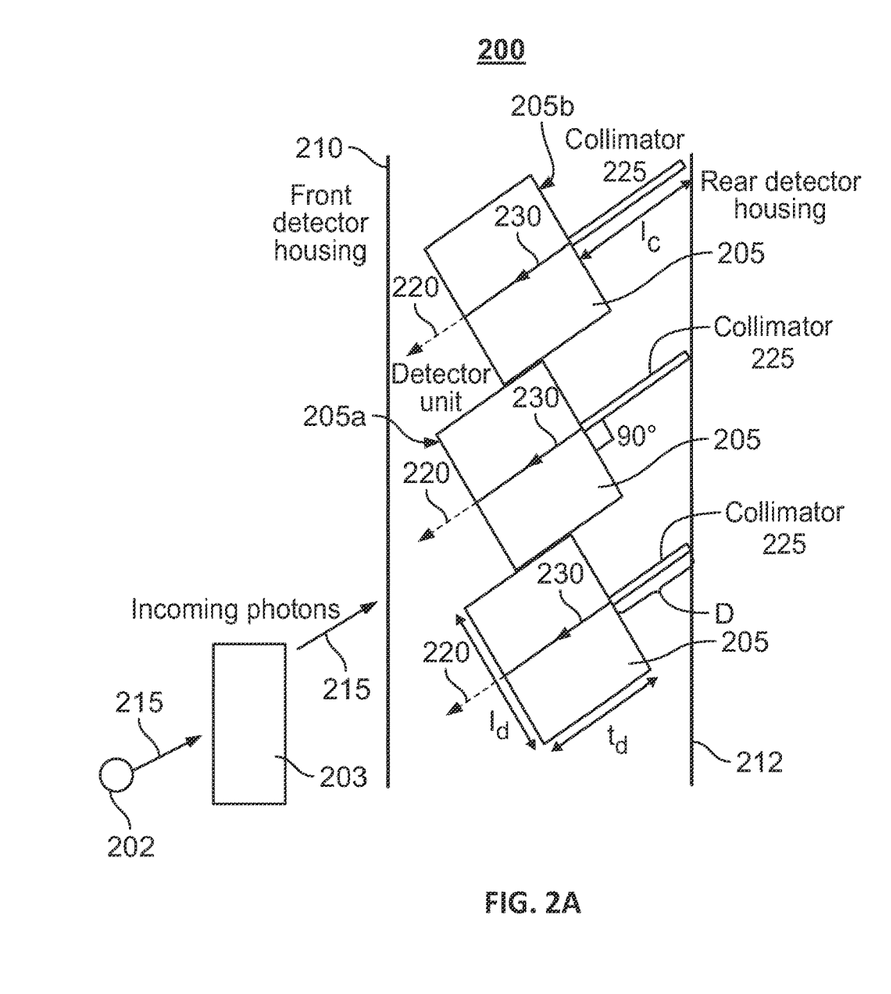
FIG. 2A shows a first side view of a portion of a detector arrangement, in accordance with some embodiments of the present specification.
Figure 2B:
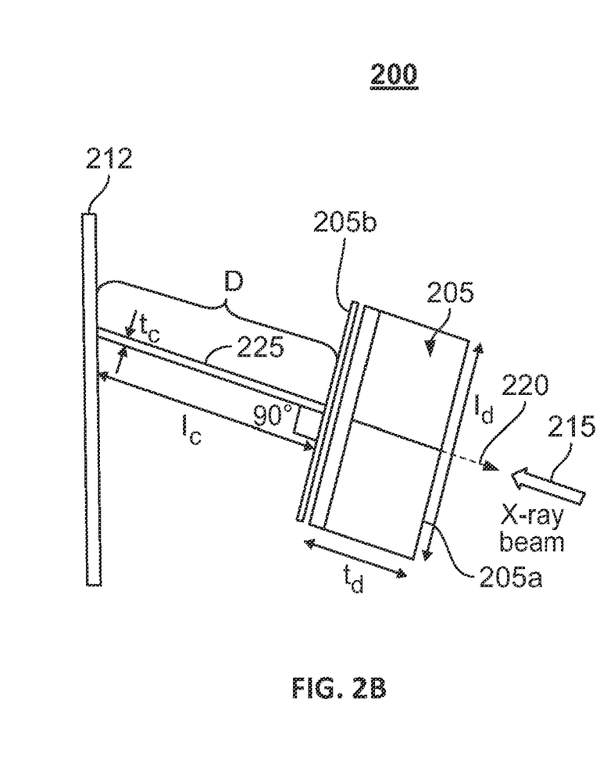
FIG. 2B shows a second side view of a portion of the detector arrangement of FIG. 2A, in accordance with some embodiments of the present specification.
Figure 2C:
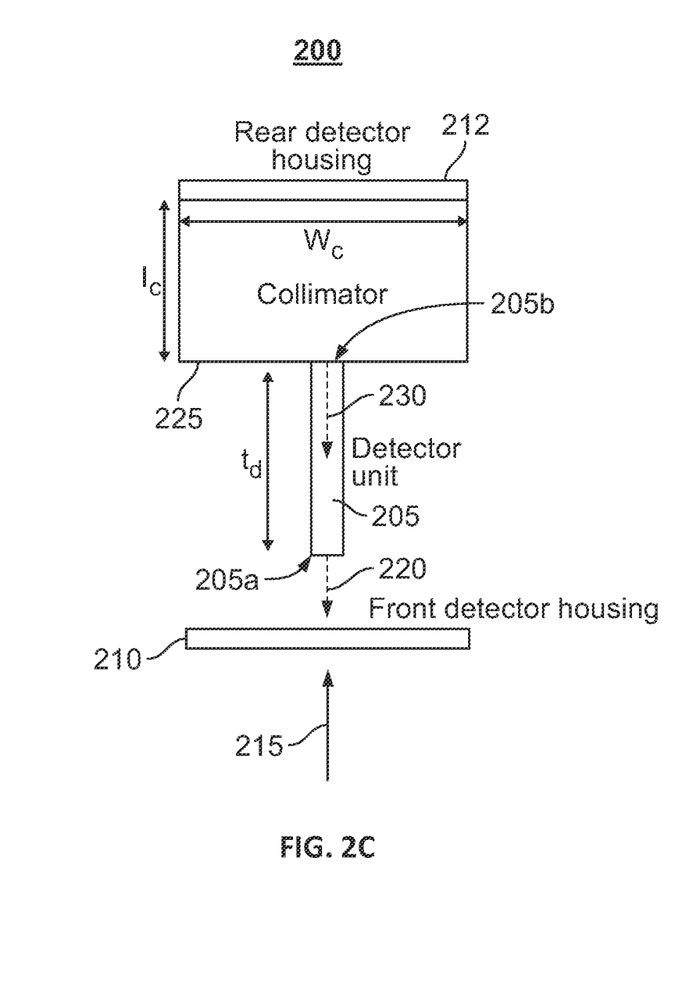
FIG. 2C is a first top-down view of a portion of the detector arrangement of FIG. 2A, in accordance with some embodiments of the present specification.
Figure 2D:
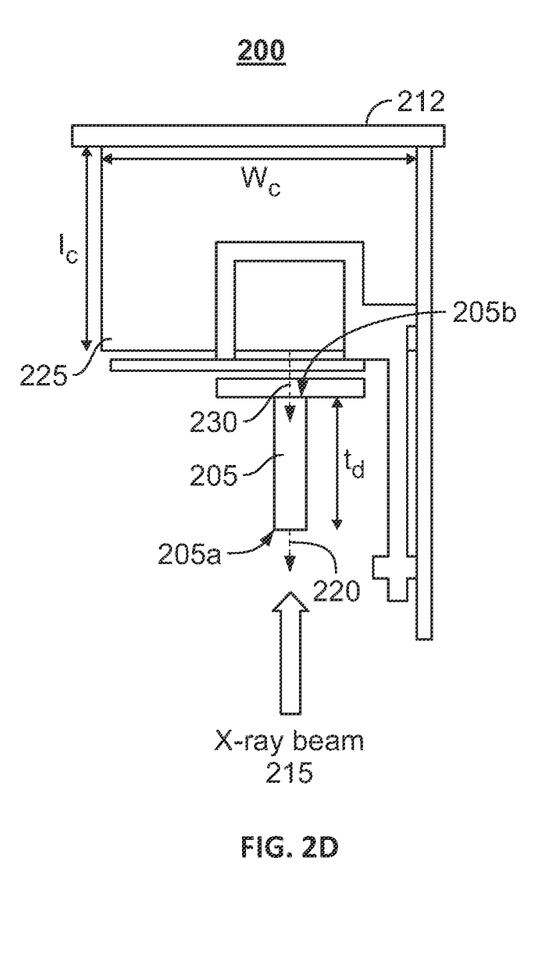
FIG. 2D is a second top-down view of a portion of the detector arrangement of FIG. 2A, in accordance with some embodiments of the present specification.
Figure 2E:
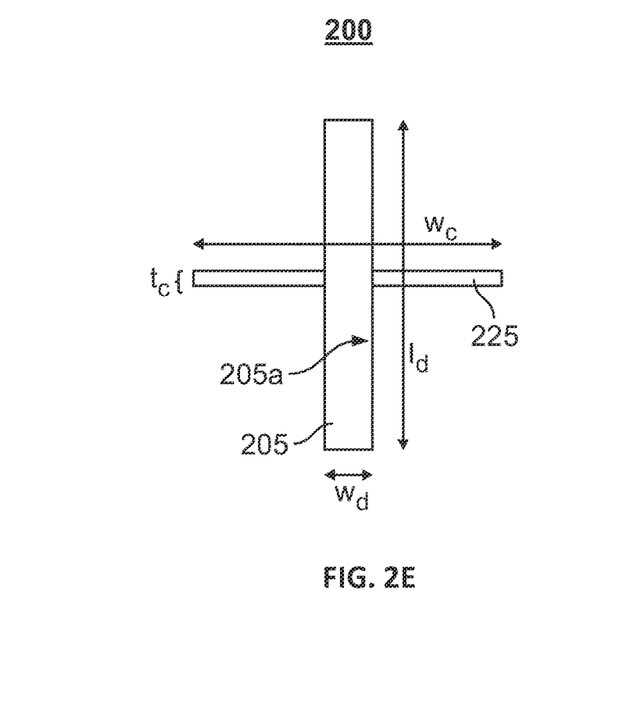
FIG. 2E is an X-ray beam-view of a portion of the detector arrangement of FIG. 2A, in accordance with some embodiments of the present specification.
Figure 2F:
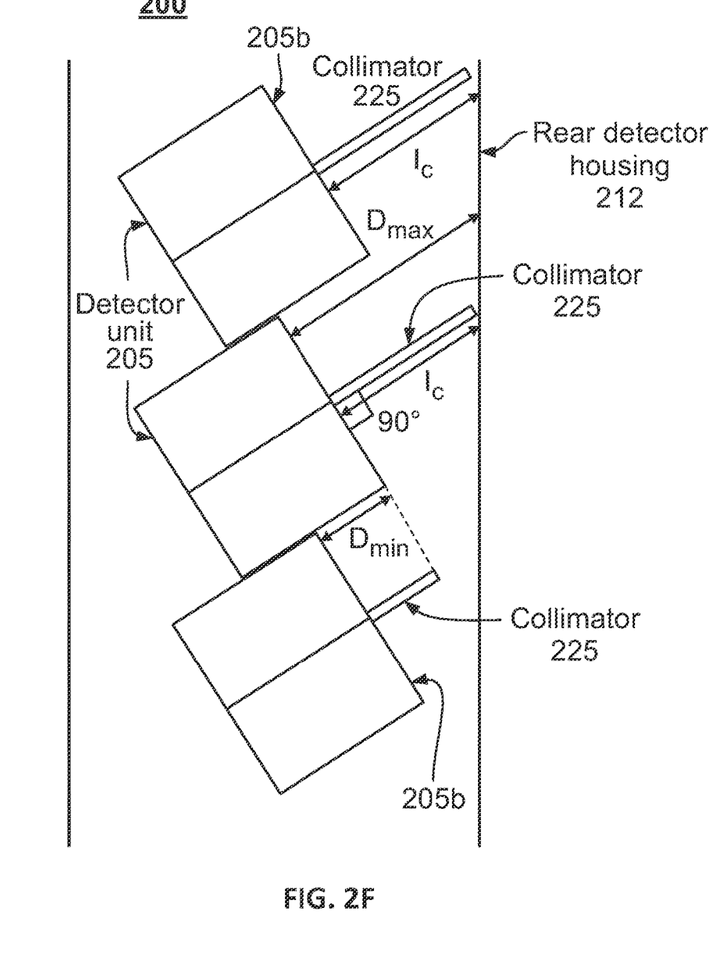
FIG. 2F is a side elevation view of a detector arrangement as shown in FIG. 2A with collimators in accordance with some embodiments of the present specification.

FIGS. 2A and 2B represent a first side view and a second side view, respectively, of a portion of a detector arrangement 200, in accordance with some embodiments of the present specification. FIGS. 2C and 2D represent a first top-down view and a second top-down view, respectively, of a portion of a detector arrangement 200, in accordance with some embodiments of the present specification. FIG. 2E represents an X-ray beam-view of a portion of a detector arrangement 200, in accordance with some embodiments of the present specification. FIG. 2F is a side elevation view of detector arrangement 200 with collimators, in accordance with some embodiments of the present specification. Reference will now be made to FIGS. 2A-2F, which will be described in detail simultaneously.

As shown in FIG. 2A, in some embodiments, an X-ray radiation source 202 is configured to project an X-ray beam 215, such as a fan beam, onto an object 203 being scanned so that the X-ray beam 215 is transmitted through the object 203 and impinges upon the detector arrangement 200. Alternatively, the detector arrangement 200 may be positioned on the same side of the object 203 as the radiation source 202, so that the detector arrangement 200 receives X-ray beam, which has been backscattered by the object 203.

In some embodiments, the detector arrangement 200 includes at least one array of a plurality of detector elements or units 205 positioned within a detector housing or enclosure having a first wall/side 210, a second wall/side 212, a third wall/side (not shown in the FIGS.), and a fourth wall/side (not shown in the FIGS.). It should be appreciated that while FIG. 2A illustrates a vertical configuration of the detector arrangement 200, in other embodiments the detector arrangement 200 may be configured horizontally with reference to the radiation source 202. In some embodiments, a plurality of detector arrangements 200 may be used in either one of or both vertical and horizontal configurations.

FIGS. 2A and 2C show both a first or front side 210 of the housing that faces the X-ray radiation source 202 and a second or rear side 212 opposite to the first or front side 210.

In some embodiments, the plurality of detector elements or units 205 are solid-state detectors formed from an array of scintillation crystals with associated photosensitive devices. A scintillation crystal absorbs the X-rays 215 transmitted through the object 203 and converts the absorbed radiation into photons of visible light (optical signal). This light is transmitted through the bulk of the scintillation material to a photosensitive device. The photosensitive device converts the input optical signal to an electrical current for subsequent integration by an electronic circuit. The integrated signal can then by converted to digital data for transfer to at least one processor which is able to render the data (onto a display or monitor) to a human readable form such as a scan image. In some embodiments, scintillation materials have high density and high atomic number and may be selected from a set of materials such as, but not limited to, CsI, NaI, BGO, CdWO4, LSO, GSO, LYSO and LaBr3. In some embodiments, the photosensitive device is a semiconductor device such as a photodiode, an avalanche photodiode or a silicon photomultiplier or it may be a vacuum tube device such as a photomultiplier tube or a more hybrid device such as a micro-channel plate with photodiode readout.

Referring now to FIGS. 2A through 2F, simultaneously, each detector element or unit 205 has a length $l_d$, a width $w_d$ and a thickness $t_d$. The size of each detector unit 205 may vary in different embodiments based on the image quality of the detection system, the source energy, and the detector material. Each detector element or unit 205 has a first side or front side 205a facing the X-ray radiation source 202 (or, in other words, the first side or front side 205a receives the X-ray beam 215) and a second side or rear side 205b opposite to the first side or front side 205a. In some embodiments, each detector element or unit 205 is tilted substantially towards the source 202 of X-ray radiation in order to limit parallax detection of the radiation beam 215. In embodiments, detector units 205 are tilted so that a central axis of each unit 205 is directly pointing at X-ray source 202. Therefore, a surface of a front side 205a of each unit 205 is perpendicular to radiation beam 215 and is positioned to receive radiation beam 215 at the center of the surface of front side 205a. As a result, each detector unit 205 has a different tilt angle, where the angle is dependent on the distance of each unit 205 from the X-ray source 202. The tilt angles of detector units 205 and the position of each unit 205 relative to other units 205: a) may be offset as long as no detector unit 205 overlaps any other detector unit 205 and, hence, occludes the x-ray beam, and b) is based on detector housing constraints. Thus, a first normal 220 to the first, front side 205a of each detector element or unit 205 points towards or is tilted towards the X-ray radiation source 202. In some embodiments, this is achieved by using a "sawtooth" arrangement of the plurality of detector elements or units 205, which is illustrated schematically in FIG. 2A.

In accordance with aspects of the present specification, each of the plurality of detector elements or units 205 is associated with a collimator 225. Each collimator 225 has a length $l_c$ (along the direction of the X-ray beam 215), a width $w_c$, and a thickness $t_c$. For each detector element or unit 205, the associated collimator 225 is positioned relative to the corresponding detector element or unit 205 in order to achieve the following: 1) a first condition of minimizing the scatter of the X-ray beam 215 (occurring due to the X-ray beam 215 impinging upon the second or rear side 212 of the detector housing), and b) a second condition of minimizing the amount of scatter produced by the collimator itself.

It should be noted herein that the detector elements 205 are positioned so that they point directly at the X-ray source 202. Stated differently, the centerline of the detectors 205 is angled so that the middle of each of the detector elements point directly at the X-ray source 202. Thus, as described below, each associated collimator 225 is positioned along the centerline at an angle of 90 degrees to the surface of rear side 205b of detector unit 205, so that it is "pointing at" or "inline" with the X-ray fan beam 215. In doing so, the X-rays are incident on as little of the rear collimator 225 as possible, minimizing any scatter from collimator 225 back into the detector units 205. If the collimator angle is not 90 degrees, then the X-ray will have a greater surface area to scatter from. Similarly, if collimator 225 is positioned away from the centerline (or midpoint), then it will not be in-line with the X-ray paths (as shown in FIG. 1C) and will have a greater surface area to cause scatter. If angles of the detector elements 205 are changed, for example, if detectors elements 205 are aligned to the X-ray source 202 at the top edge or bottom edge of front side 205a of detector units 205, then each corresponding collimator 225 will also have to be re-aligned or re-positioned such that it satisfies the minimal surface area for scatter.

In order to achieve or enable the first and second conditions stated above, each collimator 225 may be characterized by at least one of the following specifications. As a first characteristic, in some embodiments, each collimator 225 may be positioned directly behind the corresponding detector element or unit 205. Thus, each collimator 225 is positioned behind the second or rear side 205b of the corresponding detector element or unit 205. In some embodiments, each collimator 225 is positioned in a range of 10 mm to 0 mm, and any numerical increment therein, from a center of the rear side of the corresponding detector element or unit 205.

As a second characteristic, each collimator 225 may be positioned half-way (or at a mid-point) down the length $l_d$ of the corresponding detector element or unit 205. That is, the collimator 225 is positioned at a point that is at half of the length of the corresponding detector element or unit 205. Stated differently, the collimator 225 is positioned at the center of the second or rear side 205b of the corresponding detector element or unit 205, such that each collimator 225 is directly in line with X-ray beam 215. In some embodiments, each collimator 225 is positioned at a point that is in a range of 40% to 60%, and any numerical increment therein, of the length of the corresponding detector element or unit 205. In some embodiments, each collimator 225 is positioned at a point that is in a range of 48% to 52%, and any numerical increment therein, of the length of the corresponding detector element or unit 205.

As a third characteristic, each collimator 225 may have a second normal 230 that is substantially parallel to the first normal 220, wherein the second normal 230 is perpendicular to the surface of rear side 205b of corresponding detector unit 205. In some embodiments, the first and second normal 220, 230 are substantially co-axial. Thus, the collimator 225 is oriented perpendicular (90°) to the second or rear side 205b of a corresponding detector element or unit 205 as a result of which the second normal 230 is also tilted (or points back) substantially towards the X-ray radiation source 202.

As a fourth characteristic, the collimator 225 may have a length $l_c$ (see FIG. 2F) that extends a substantial portion of a distance 'D' from the second or rear side 205b of the corresponding detector element or unit 205 towards the second or rear side 212 of the detector housing. In some embodiments, the collimator 225 extends from the second or rear side 205b of the corresponding detector element or unit 205 to a point proximate the second or rear side 212 of the detector housing. In some embodiments, the length $l_c$ is equal to the distance 'D'. In some embodiments, the length $l_c$ is at least $\frac{2}{3}^{rd}$ of the distance 'D'. In some embodiments, the length $l_c$ is equal to 50% to 99%, and any numerical increment therein, of the distance 'D'. In some embodiments, the length $l_c$ is equal to 80% to 100%, and any numerical increment therein, of the distance 'D'. In embodiments, a maximum length of D ($D_{max}$) is as long as physically possible within the detector housing, and a minimum length of D ($D_{min}$) is the length of offset of detector unit 205 above the corresponding collimator 225. Thus, the collimator 225 covers all or a substantial part of the length from the rear of the corresponding detector element or unit 205 to the rear of the detector housing 212. It should be appreciated that the length $l_c$ of each collimator 225 will be different and varies owing to a different distance 'D' of each detector element or unit 205 from the second or rear side 212 of the detector housing. In embodiments, the collimator 225 should be of a sufficient length to cover the full air gap between the rear of the detector element or unit 205 and the rear of the detector housing 212 (or any "rear object" that may be positioned behind the detector, such as a beam stop). This design allows for any scatter that is generated to be fully covered by the collimators 225.

As a fifth characteristic, each collimator 225 may have a width $w_c$ that is sufficient to cover a substantial width of the X-ray fan beam 215. In embodiments, $w_c$ covers an amount ranging within full width of beam 215 to at least 50% of beam 215, thereby ensuring that collimators 225 cover the full width half maximum region and, therefore, most of the beam intensity. The X-ray fan beam 215 is created via collimation at the X-ray source 202. From a top-down view, the fan beam 215 appears thin at the source of collimation (on the order of 3 mm to 5 mm). The beam 215, however, is divergent and becomes wider as the distance from the source 202 increases. The distance of the detector elements 205 from the source 202 is system dependent and thus, the X-ray beam 215 width varies with the system. It should be appreciated that the width $w_d$ of each detector element or unit 205 is substantially small compared to the width of the X-ray fan beam 215. In some embodiments, the width $w_d$ is about 100 mm. In some embodiments, the width $w_d$ ranges from 85 mm to 110 mm. Thus, in embodiments, the width of the rear collimator 225 is designed such that it covers the full-width-half maximum of the beam 215 at the point where the beam 215 reaches the detector elements 205.

As a sixth characteristic, each collimator 225 may have a thickness $t_c$ that enables the collimators 225 to be sufficiently thin such that when viewed from the point of view of the incoming X-rays 215 there is very little collimator surface for scatter to occur while at the same time having the thickness $t_c$ that enables the collimator 225 to be thick enough to stop photons from being scattered from the second or rear side 212 of the detector housing. In some embodiments, the thickness $t_c$ is about 3 mm. In some embodiments, the thickness $t_c$ ranges from 2 mm to 5 mm depending on the material. In some embodiments, the thickness $t_c$ is in a range of 1.5 mm to 4.5 mm and any numerical increment therein.

In various embodiments, the material used to fabricate collimators 225 is dependent on the energy of the X-ray source 202. High-energy sources will require the use of materials with high atomic numbers such as, for example, Tungsten or Lead. Lower energy sources may use steel, copper, or aluminum, for example.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A detector array adapted to detect radiation emitted from a radiation source, comprising:
    a plurality of detector elements enclosed in a housing, wherein the housing has at least a first wall and a second opposing wall positioned a predefined distance away from the first wall, wherein the first wall faces the radiation source, wherein a front side of each of the plurality of detector elements substantially faces the first wall, and wherein a rear side of each of the plurality of detector elements substantially faces the second opposing wall; and
    a plurality of collimators, wherein each of the plurality of collimators is positioned behind one of the plurality of detector elements such that said one of the plurality of detector elements is positioned between said each of the plurality of collimators and the first wall and such that said each of the plurality of collimators extends from the rear side of said one of the plurality of detector elements to a position proximate the second side of the housing.

2. The detector array of claim 1, wherein each of the plurality of collimators extends from the rear side of said one of the plurality of detector elements to physically touch the second side of the housing.

3. The detector array of claim 1, wherein each of the plurality of detector elements has a length, and wherein each of the plurality of collimators is positioned at a point that is at half of the length of the corresponding one of the plurality of detector elements.

4. The detector array of claim 1, wherein each collimator of the plurality of detector elements is oriented perpendicular to the rear side of the corresponding one of the plurality of detector elements.

5. The detector array of claim 1, wherein each of the plurality of collimators has a width, wherein the radiation emitted from the radiation source is an X-ray beam having a thickness, and wherein said width is in a range of 10% to 100% of said thickness of the X-ray beam.

6. The detector arrangement of claim 1, wherein each of the plurality of collimators has a width in a range of 2 mm to 5 mm.

7. A detection system for scanning an object, comprising:
    an X-ray source configured to generate an X-ray beam that is projected onto the object;
    a detector array adapted to receive the X-ray beam that is transmitted through the object, wherein the detector array comprises a plurality of detector elements enclosed in a housing, wherein the housing has at least a first side and a second opposing side positioned a first distance away from the first side, wherein each of the plurality of detector elements is positioned between the first side and the second opposing side such that a front side of each detector is positioned to receive the X-ray beam at a perpendicular angle relative to a center of the front side; and
    a plurality of collimators, wherein each of the plurality of collimators is positioned behind one of the plurality of detector elements and wherein each of the plurality of collimators is oriented perpendicular to a rear side of the corresponding one of the plurality of detector elements.

8. The detection system of claim 7, wherein the plurality of detector elements is arranged in a saw-tooth arrangement.

9. The detection system of claim 7, wherein each of the plurality of detector elements is tilted substantially towards the X-ray source for limiting parallax detection of the X-ray beam.

10. The detection system of claim 7, wherein each of the plurality of detector elements is tilted substantially towards the X-ray source such that a central axis of each of the plurality of detector elements is directly aligned with the X-ray beam emitted from the X-ray source.

11. The detection system of claim 7, wherein each of the plurality of detector elements is separated from the second opposing side by a second distance.

12. The detection system of claim 11, wherein each of the plurality of collimators has a length that is equal to 50% to 99% of said second distance.

13. The detection system of claim 11, wherein each of the plurality of collimators has a length that is substantially equal to the second distance.

14. The detection system of claim 11, wherein each of the plurality of collimators has a length that is equal to 80% to 100% of said second distance.

15. The detection system of claim 7, wherein each of the plurality of detector elements has a length, and wherein each of the plurality of collimators is positioned at a point that is in a range of 40% to 60% of the length of the corresponding one of the plurality of detector elements.

16. The detection system of claim 7, wherein each of the plurality of detector elements has a length, and wherein each of the plurality of collimators is positioned at a point that is in a range of 48% to 52% of the length of the corresponding one of the plurality of detector elements.

17. The detection system of claim 7, wherein each of the plurality of collimators is positioned at in a range of 10 mm to 0 mm from a center of the rear side of the corresponding one of the plurality of detector elements.

18. The detection system of claim 7, wherein the X-ray beam is a fan beam having a first width, and wherein each of the plurality of collimators has a second width adapted to cover 50% to 100% of the first width.

19. The detection system of claim 7, wherein each of the plurality of collimators has a thickness of 3 mm.

20. The detection system of claim 7, wherein each of the plurality of collimators has a thickness of in a range of 1.5 mm to 4.5 mm.

* * * * *